(12) United States Patent
Zhou et al.

(10) Patent No.: US 9,544,832 B2
(45) Date of Patent: Jan. 10, 2017

(54) METHOD, APPARATUS AND SYSTEM FOR POLICY CONTROL

(71) Applicant: ZTE CORPORATION, Shenzhen, Guangdong Province (CN)

(72) Inventors: Xiaoyun Zhou, Shenzhen (CN); Jianjie You, Shenzhen (CN); Chunhui Zhu, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/411,345

(22) PCT Filed: May 16, 2013

(86) PCT No.: PCT/CN2013/075691
§ 371 (c)(1),
(2) Date: Dec. 24, 2014

(87) PCT Pub. No.: WO2014/000520
PCT Pub. Date: Jan. 3, 2014

(65) Prior Publication Data
US 2015/0334633 A1 Nov. 19, 2015

(30) Foreign Application Priority Data

Jun. 29, 2012 (CN) .......................... 2012 1 0222986

(51) Int. Cl.
*H04W 4/00* (2009.01)
*H04W 48/02* (2009.01)
(Continued)

(52) U.S. Cl.
CPC .............. *H04W 48/02* (2013.01); *H04L 12/66* (2013.01); *H04W 28/24* (2013.01); *H04W 84/042* (2013.01); *H04W 84/12* (2013.01)

(58) Field of Classification Search
CPC ...... H04W 80/04; H04W 84/12; H04W 88/06; H04W 88/08; H04W 84/18
See application file for complete search history.

(56) References Cited

U.S. PATENT DOCUMENTS

2010/0299674 A1* 11/2010 Wang .................. H04L 12/5695
718/104
2011/0320323 A1* 12/2011 Cuervo ............... H04L 12/1407
705/30
(Continued)

FOREIGN PATENT DOCUMENTS

CN 102316602 A 1/2012
CN 102469531 A 5/2012
(Continued)

OTHER PUBLICATIONS

U.S. Appl. No. 61/639,008 Specification.*
(Continued)

*Primary Examiner* — Hassan Phillips
*Assistant Examiner* — Siren Wei
(74) *Attorney, Agent, or Firm* — Plumsea Law Group, LLC

(57) ABSTRACT

A method, equipment and system for policy control. The method includes: a trusted Wireless Local Area Network (WLAN) access gateway receiving Quality of Service (QoS) information from a 3GPP core network, and sending the QoS information to an Access Controller (AC) or a Broadband Network Gateway (BNG); the AC or the BNG or other fixed network access devices performing admission control and/or resource allocation according to the QoS information. In the technical solution, the interface configuration and policy configuration are performed for the WLAN access gateway (Continued)

in the fixed mobile convergence scenario, thereby the policy control is implemented in the fixed mobile convergence scenario.

19 Claims, 14 Drawing Sheets

(51) Int. Cl.
  *H04W 28/24* (2009.01)
  *H04L 12/66* (2006.01)
  *H04W 84/04* (2009.01)
  *H04W 84/12* (2009.01)

(56) References Cited

U.S. PATENT DOCUMENTS

| | | | |
|---|---|---|---|
| 2012/0082313 A1 | 4/2012 | Diamant et al. | |
| 2013/0089013 A1* | 4/2013 | Carnero Ros | H04W 28/12 370/310 |
| 2013/0288644 A1* | 10/2013 | Schroeder | H04W 12/06 455/411 |
| 2013/0343269 A1* | 12/2013 | Evans | H04W 40/02 370/328 |
| 2014/0341138 A1* | 11/2014 | Roeland | H04W 76/021 370/329 |

FOREIGN PATENT DOCUMENTS

| | | |
|---|---|---|
| EP | 2194737 A1 | 6/2010 |
| EP | 2197163 A1 | 6/2010 |
| EP | 2312875 A1 | 4/2011 |
| WO | 2012/048290 A1 | 4/2012 |

OTHER PUBLICATIONS

U.S. Appl. No. 61/662,554 Specification.*
U.S. Appl. No. 61/536,116 Specification.*
"3GPP TR 23.852 V0.4.0 (Oct. 2011)", 3rd Generation Partnership Project; Technical Specification Group Services and System Aspects; Study on S2a Mobility based on GTP & WLAN access to EPC (SaMOG); Oct. 2011, pp. 1-38, Release 11.
Supplementary European Search Report issued Nov. 9, 2015 in European Patent Application No. EP 13810163.9.

* cited by examiner

METHOD, APPARATUS AND SYSTEM FOR POLICY CONTROL

CROSS-REFERENCE TO RELATED APPLICATION(S)

This application is the U.S. National Phase application of PCT application number PCT/CN2013/075691 having a PCT filing date of May 16, 2013, which claims priority of Chinese patent application 201210222986.8 filed on Jun. 29, 2012, the disclosures of which are hereby incorporated by reference.

TECHNICAL FIELD

The present document relates to the fixed mobile convergence technical field, and particularly to a method, an apparatus and a system for policy control in a fixed mobile convergence scenario.

BACKGROUND OF THE INVENTION

The present FIG. 1 is a schematic diagram of a composition framework of EPS (Evolved Packet System) of 3GPP (3rd Generation Partnership Project). As shown in FIG. 1, the EPS network framework in a non-roaming scenario includes: E-UTRAN (Evolved Universal Terrestrial Radio Access Network), MME (Mobility Management Entity), S-GW (Serving Gateway), PDN GW (also called as P-GW, Packet Data Network Gateway), HSS (Home Subscriber Server), PCRF (Policy and Charging Rules Function) entities and other supporting nodes.

Wherein, the PCRF is a core of the PCC (Policy and Charging Control), and is responsible for formulating policy strategy and charging rules. The PCRF provides network controlling rules based on service data stream, and the network controlling includes service data stream detection, gating control, QoS (Quality of Service) control and charging rules based on data stream and so on. The PCRF sends the policy and charging rules formulated by itself to the PCEF (Policy and Charging Enforcement Function) for enforcement. Meanwhile, the PCRF is also required to ensure that the rules are coincident with the subscribers' subscription information. The basis for the PCRF to formulate policy and charging rules includes: acquiring service-related information from AF (Application Function); acquiring subscribers' subscription information of policy and charging control from SPR (Subscription Profile Repository); and acquiring bearer-related network information from PCEF.

The EPS supports communication with non-3GPP systems, and the EPS communicates with non-3GPP systems through S2a/b/c interfaces, using a P-GW as an anchor between 3GPP systems and non-3GPP systems. As shown in FIG. 1, non-3GPP systems are classified into trusted non-3GPP IP access and untrusted non-3GPP IP access. The trusted non-3GPP IP access can be connected with a P-GW through an S2a interface directly; the untrusted non-3GPP IP access is required to connect with P-GW through ePDG (Evolved Packet Data Gateway), where an interface between an ePDG and a P-GW is an S2B interface, and signaling and data between UE (User Equipment) and ePDG are encrypted for protection with IPSec (Internet Protocol Security). The S2c interface provides control and mobility support related to the user side between UE and P-GW, and the mobility management protocol supported by the S2c interface is DSMIPv6 (Mobile IPv6 Support for Dual Stack Hosts and Routers).

With the development of network technology, many operators begin to concern FMC (Fixed Mobile Convergence), and research on the connection and communication between 3GPP and BBF. In the scenario that subscribers access the mobile core network through BBF, it needs to ensure the QoS of the data in the whole transmission path (data may be transmitted through fixed network and mobile network). In the related art, the QoS is ensured by interacting with BPCF (Broadband Policy Control Framework) in the BBF access through PCRF. BPCF is the policy control framework of BBF access. For the resource request message of PCRF, BPCF performs, according to the network policy, subscription information and so on of the BBF access, resource admission control or forwards the resource request message to other network elements of the BBF access network (such as BNG (Broadband Network Gateway)), and then other network elements perform the resource admission control (i.e. other network elements are entrusted to perform resource admission control). For example, when a UE accesses the 3GPP core network through WLAN (Wireless Local Area Network), PCRF needs to interact with BPCF when performing QoS authorization in order to ensure a demand for a total bandwidth for visiting services by all the UEs accessing through WLAN accessing line being not larger than the bandwidth of the line (such as the subscription bandwidth or the largest physical agent supported by the line), thus the BBF access network performs resource admission control.

At present, one important scenario of studying interconnection and intercommunication between 3GPP and BBF is: a scenario of a 3GPP UE accessing the EPS through the WLAN of BBF. Many operators think that WLAN can be taken as a trusted non-3GPP system, thereby the problem of interconnection and intercommunication for UE accessing EPS through the trusted WLAN has been attached importance gradually and on the start of research. FIG. 2 is a schematic diagram of the framework for a UE accessing an EPC (Evolved Packet Core) network through WLAN in the related art, wherein, one logic network element of the WLAN interconnects with P-GW of 3GPP through an S2a interface, and the S2a interface supports GTP (Generic Tunneling Protocol)/PMIP (Proxy Mobile IP).

In the related art, to make AC (Access Controller)/BNG (Broadband Network Gateway) support S2a interface, all AC/BNG devices are required to upgrade, which will seriously impacts the present network.

In order to solve the problem, in the related art, it proposes to introduce a WLAN access network (such as TWAG' (Trusted WLAN Access Gateway) as shown in FIG. 3), by this way, accessing the 3GPP network can be implemented without need of upgrading the AC/BNG devices on a large scale, as a result, upgrading and modification for the present network are lessened. In that framework, TWAG' is added to WLAN, which is responsible for the intercommunication of the control plane messages and user plane data between WLAN and EPC network. Wherein, TWAG' can be deployed alone, and can also be integrated in BSG (Broadband Service Gateway). In that framework, the related critical interfaces and functions thereof are described as follows:

Interface C: is an interface between TWAG' and BBF AAA (Authentication, Authorization and Accounting). That interface is used to forward the authentication message sent by BNG or BBF AAA, and the authentication success message sent by BBF AAA can be used to trigger the establishment of GTP/PMIP tunnel between TWAG' and P-GW of the EPC network.

Interface D: is an interface between TWAG' and BNG. That interface is used to forward authentication message sent by BNG or DHCP (Dynamic Host Configuration Protocol) message, and subscriber data etc.

However, there is still no solution of implementing policy control in the network framework as shown in FIG. 3.

SUMMARY OF THE INVENTION

The embodiments of the present document provide a policy control method, equipment and system, implementing policy control in the fixed mobile convergence scenario.

The embodiments of the present document provide a method for policy control, comprising:

a trusted Wireless Local Area Network (WLAN) access gateway receiving Quality of Service (QoS) information from a 3GPP core network, and sending the QoS information to an Access Controller (AC) or a Broadband Network Gateway (BNG);

the AC or the BNG or other fixed network access devices performing admission control and/or resource allocation according to the QoS information.

The step of sending the QoS information to the AC or the BNG comprises:

sending the QoS information by a Remote Authentication Dial In User Service (RADIUS) session between the trusted WLAN access gateway and the AC or the BNG established during a process of a terminal access authentication, or by a designated policy control session between the trusted WLAN and the AC or the BNG.

Wherein, when the QoS information is sent by the RADIUS session, the trusted WLAN access gateway is used as a RADIUS proxy, client or server.

Wherein, the step of the trusted WLAN access gateway receiving the QoS information from the 3GPP core network comprises:

when a General Tunnel Protocol (GTP) is applied between the trusted WLAN access gateway and a Packet Data Network Gateway (P-GW), the trusted WLAN access gateway receiving the QoS information from the P-GW; and when a Proxy Mobile Internet Protocol (PMIP) is applied between the trusted WLAN access gateway and the P-GW, the trusted WLAN access gateway receiving the QoS information from a Policy and Charging Rule Function (PCRF) entity or from the PCRF entity through a Broadband Policy Control Function (BPCF).

The method further comprises:

the trusted WLAN access gateway receiving a message for requesting for establishing a fixed network control session sent by the AC or the BNG, the trusted WLAN access gateway sending an acknowledgement message of the message for requesting for establishing the fixed network control session to the AC or the BNG; or the trusted WLAN access gateway sending the message for requesting for establishing the fixed network policy control session to the AC or the BNG, the trusted WLAN access gateway receiving the acknowledgement message of the message for requesting for establishing the fixed network policy control session sent by the AC or the BNG; or the trusted WLAN access gateway sending a triggering message for requesting for establishing the fixed network policy control session to the AC or the BNG, receiving the message for requesting for establishing the fixed network policy control session sent by the AC or the BNG, the trusted WLAN access gateway sending the acknowledgement message of the message for requesting for establishing the fixed network policy control session to the AC or the BNG.

The method further comprises: when the PMIP is adopted between the trusted WLAN access gateway and the P-GW, the trusted WLAN access gateway sending the message for requesting for establishing the fixed network policy control session to the BPCF; the trusted WLAN access gateway receiving the acknowledgement message of the message for requesting for establishing the fixed network policy control session sent by the BPCF.

The method further comprises: when the PMIP is adopted between the trusted WLAN access gateway and the P-GW, the trusted WLAN access gateway sending a gateway control session establishing message to the PCRF; and the trusted WLAN access gateway receiving a gateway control session establishing acknowledgement message sent by the PCRF.

Wherein, the step of the trusted WLAN access gateway receiving the message for requesting for establishing the fixed network policy control session sent by the AC or the BNG; or the trusted WLAN access gateway sending the message for requesting for establishing the fixed network policy control session to the AC or the BNG; or the trusted WLAN access gateway sending the triggering message for requesting for establishing the fixed network policy control session to the AC or the BNG comprises:

in a case that the terminal access authentication succeeds, the trusted WLAN access gateway receiving the message for requesting for establishing the fixed network policy control session sent by the AC or the BNG, or the trusted WLAN access gateway sending the message for requesting for establishing the fixed network policy control session to the AC or the BNG, or the trusted WLAN access gateway sending the triggering message for requesting for establishing the fixed policy control session to the AC or the BNG; or after the terminal initiates a Dynamic Host Configuration Protocol (DHCP) request, the trusted WLAN access gateway receiving the message for requesting for establishing the fixed network policy control session sent by the AC or the BNG, or the trusted WLAN access gateway sending the message for requesting for establishing the fixed network policy control session to the AC or the BNG, or the trusted WLAN access gateway sending the triggering message for requesting for establishing the fixed network policy control session to the AC or the BNG.

The method further comprises:

configuring an interface D' between the trusted WLAN access gateway and the AC or the BNG, and using the interface D' to implement one of the following functions: transferring the QoS information and admission control and/or resource allocation result by a Remote Authentication Dial In User Service (RADIUS) session established during the terminal access authentication; establishing a separate policy control session to transfer the QoS information and the admission control and/or resource allocation result.

The method further comprises:

configuring an interface R' between the trusted WLAN access gateway and the BPCF, and using the interface R' to implement policy issuing and result feedback between the trusted WLAN access gateway and the BPCF.

The method further comprises: configuring an interface Gxd' between the trusted WLAN access gateway and the PCRF, and using the interface Gxd' to implement policy negotiation and result feedback between the trusted WLAN access gateway and the PCRF.

An embodiment of the present document further provides a trusted Wireless Local Area Network (WLAN) access gateway, comprising:

a receiving module, configured to: receive Quality of Service (QoS) information from a 3GPP core network;

a sending module, configured to: send the QoS information to an Access Controller (AC) or a Broadband Network Gateway (BNG).

The trusted WLAN access gateway further comprises a session establishing module, wherein, the session establishing module is configured to: establish a Remote Authentication Dial In User Service (RADIUS) session with the AC or the BNG during a process of a terminal access authentication, or establish a designated policy control session with the AC or the BNG;

the sending module is configured to: send the QoS information by the RADIUS session or the designated policy control session between the trusted WLAN access gateway and the AC or the BNG.

Wherein, when the QoS information is sent by the RADIUS session, the trusted WLAN access gateway is used as a RADIUS Proxy, a Client or a Server.

Wherein, the receiving module is configured to:

receive the QoS information from the P-GW when a General Tunnel Protocol (GTP) is adopted between the trusted WLAN access gateway and a Packet Data Network Gateway (P-GW);

receive the QoS information from a Policy and Charging Rule Function (PCRF) entity or from the PCRF entity through a Broadband Policy Control Framework (BPCF) when Proxy Mobile Internet Protocol (PMIP) is adopted between the trusted WLAN access gateway and the P-GW.

The trusted WLAN access gateway further comprises: a first fixed network policy processing module, wherein, the first fixed network policy processing module is configured to: receive a message for requesting for establishing a fixed network policy control session sent by the AC or the BNG; and send an acknowledgement message of the message for requesting for establishing the fixed network policy control session to the AC or the BNG;

or, send the message for requesting for establishing the fixed network policy control session to the AC or the BNG; receive the acknowledgement message of the message for requesting for the fixed network policy control session sent by the AC or the BNG;

or, send a triggering message for requesting for establishing the fixed network policy control session to the AC or the BNG, receive the message for requesting for establishing the fixed network policy control session sent by the AC or the BNG, and send the acknowledgement message of the message for requesting for establishing the fixed network policy control session to the AC or the BNG.

Wherein, the first fixed network policy processing module is configured to:

in a case that the terminal access authentication succeeds, receive the message for requesting for establishing the fixed network policy control session sent by the AC or the BNG, or send the message for requesting for establishing the fixed network policy control session to the AC or the BNG, or send a triggering message for requesting for establishing the fixed policy control session to the AC or the BNG;

or after the terminal initiates a Dynamic Host Configuration Protocol (DHCP) request, receive the message for requesting for establishing the fixed network policy control session sent by the AC or the BNG, or send the message for requesting for establishing the fixed network policy control session to the AC or the BNG, or send the triggering message for requesting for establishing the fixed network policy control session to the AC or the BNG.

The trusted WLAN access gateway further comprises: a second fixed network policy processing module, wherein, the second fixed network policy processing module is configured to: when the PMIP is adopted between the trusted WLAN access gateway and the P-GW, send the message for requesting for establishing the fixed network policy control session to the BPCF; receive the acknowledgement message of the message for requesting for establishing the fixed network policy control session sent by the BPCF.

Wherein, the second fixed network policy processing module is further configured to: when the PMIP is adopted between the trusted WLAN access gateway and the P-GW, send a gateway control session establishing message to the PCRF; and receive a gateway control session establishing acknowledgement message sent by the PCRF.

An embodiment of the present document further provides a system for policy control, comprising an Access Controller (AC) or a Broadband Network Gateway (BNG), and the trusted Wireless Local Area Network (WLAN) access gateway described above.

By applying the method, equipment and system provided by the embodiments of the present document, the interface configuration and policy configuration are performed for the WLAN access gateway in the fixed mobile convergence scenario, thereby the policy control is implemented in the fixed mobile convergence scenario.

BRIEF DESCRIPTION OF THE DRAWINGS

The FIG. 1 is a structural schematic diagram of implementing intercommunication between the 3GPP network and the non-3GPP network in the related art.

PREFERRED EMBODIMENTS OF THE INVENTION

The embodiments of the present document will be described in detail in the following in combination with the drawings. It should be noted that the embodiments and the features in the embodiments of the present application can be combined in any way in the case of no conflict.

Figure 1:
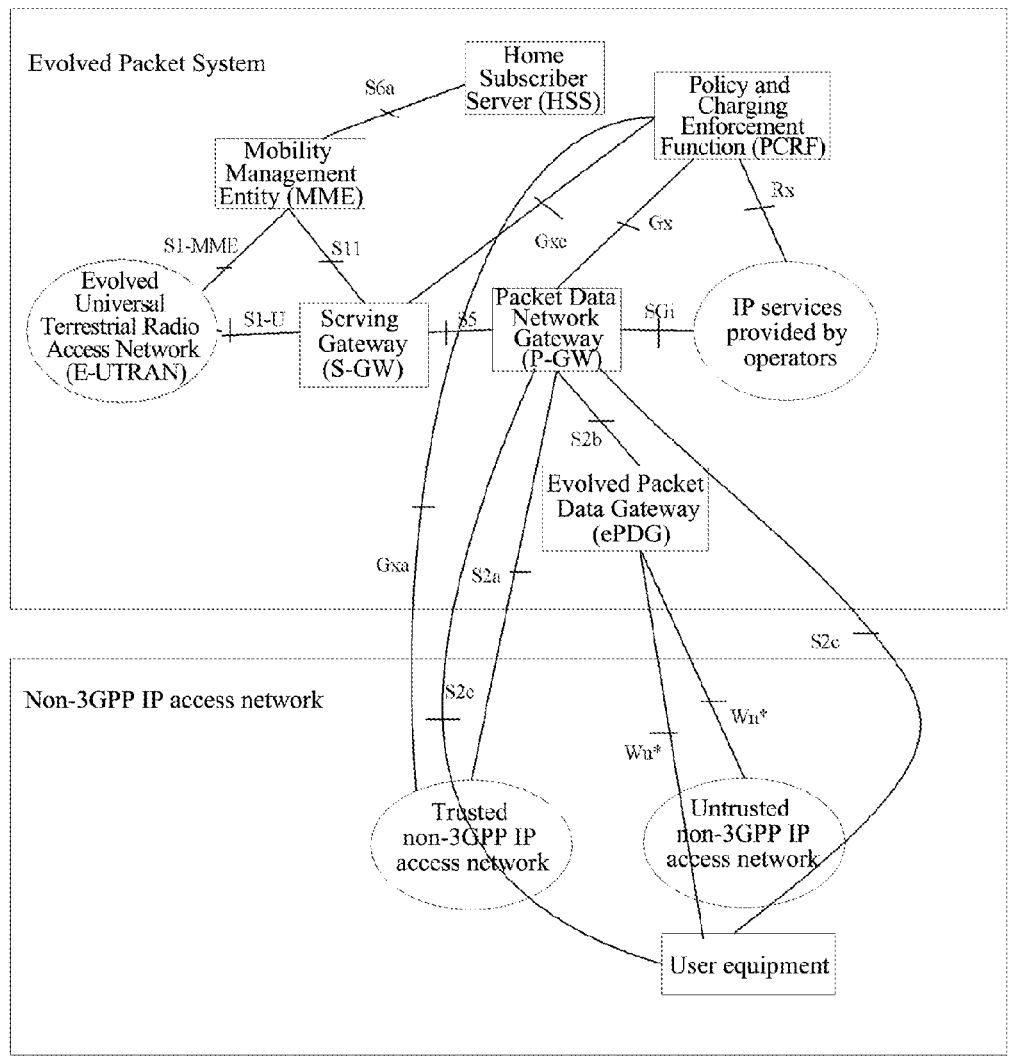
Figure 2:
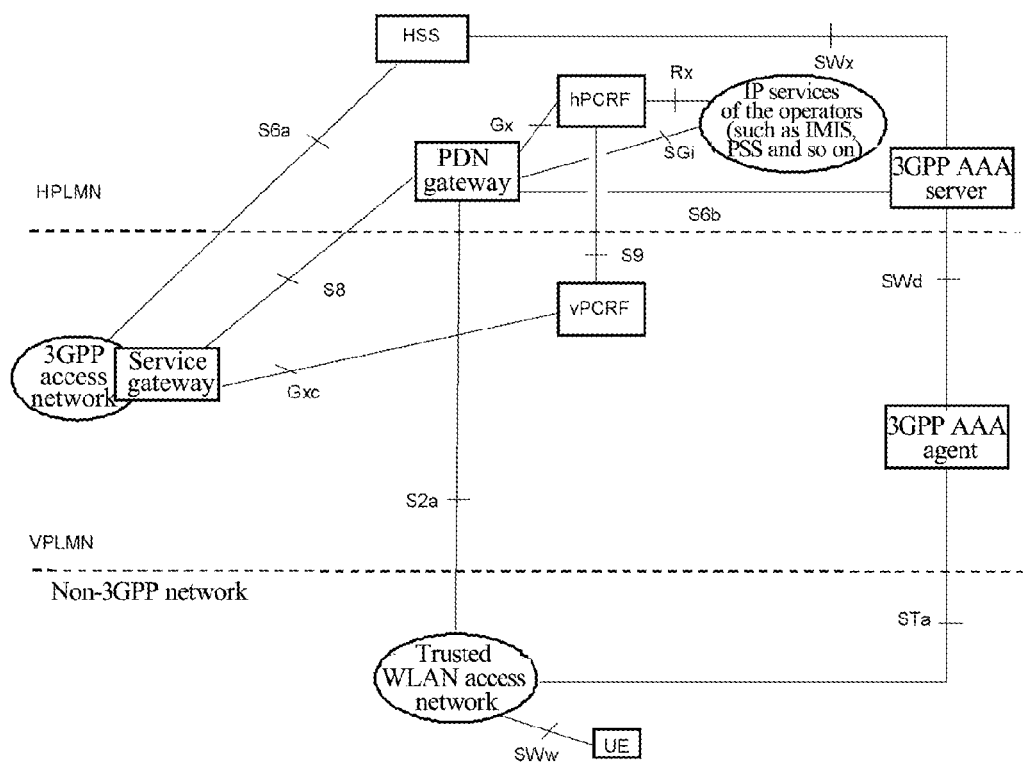
FIG. 2 is a schematic diagram of a framework of a UE accessing an EPC network through the WLAN in the related art.
Figure 3:
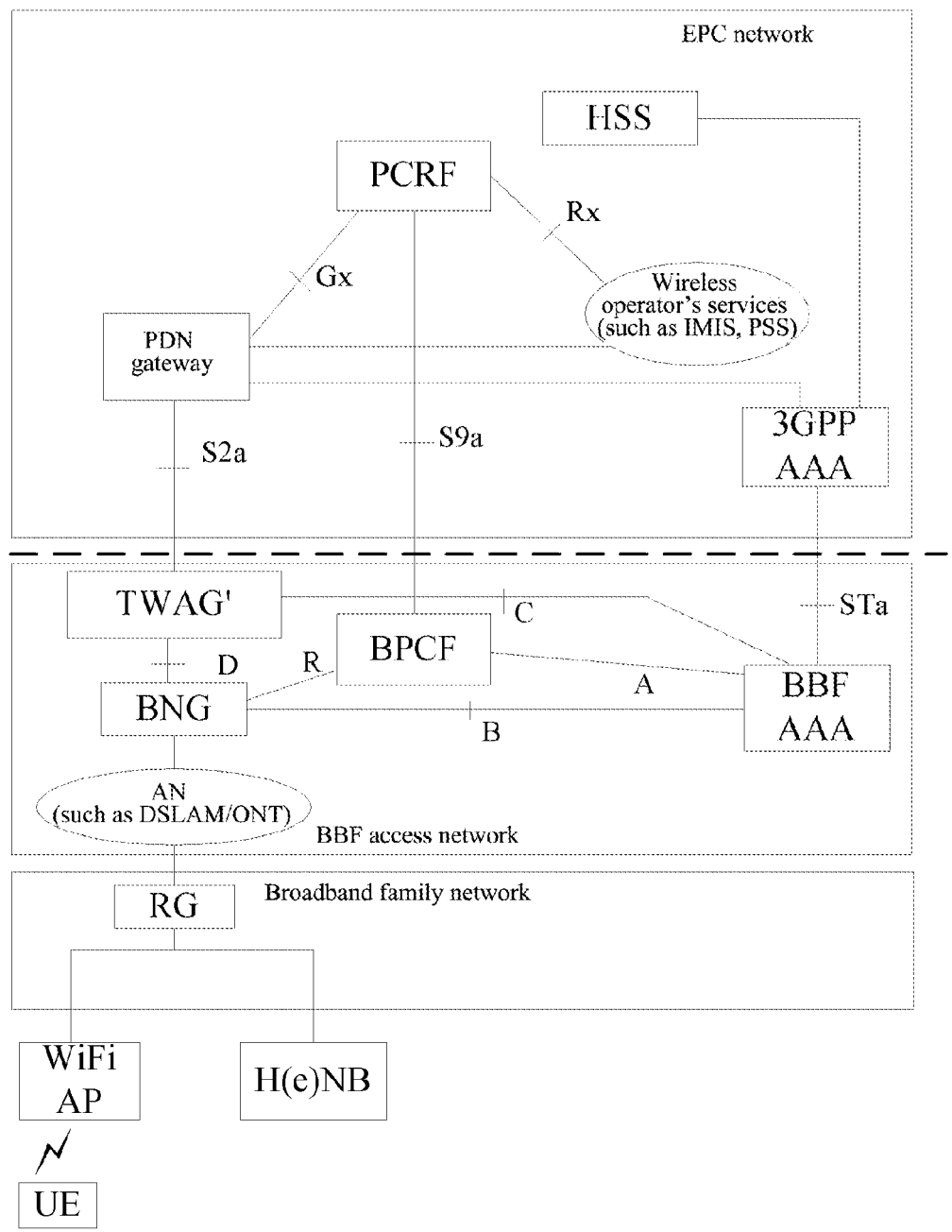
FIG. 3 is a schematic diagram of the framework 1 of a UE accessing an EPC network through a WLAN S2a interface after TWAG' is introduced.

The network framework as shown in FIG. 3 is related to the BBF access framework. It should be noted that the framework is also suitable to other WLAN access networks, where RG (Residential Gateway) is replaced with AP (Access Point), and BNG is replaced with AC (Access Controller). The BBF access framework is taken as an example in the following description. Similarly, it should be noted that the solutions according to the embodiments of the present document that will be introduced in the following are also suitable to other WLAN access networks.

Figure 4:
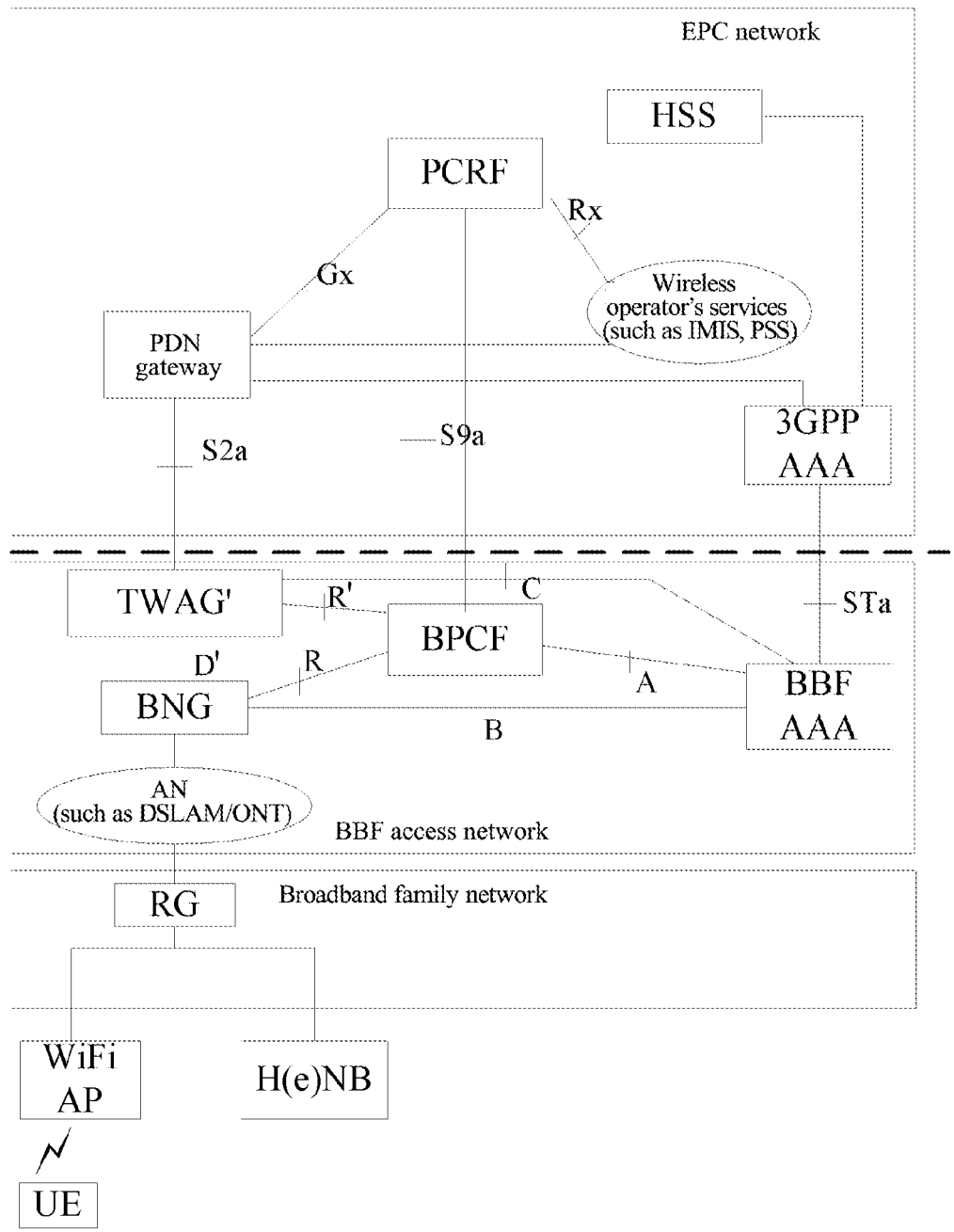
FIG. 4 is a policy control framework 1 in the intercommunication scenario based on the framework 1 according to the embodiment of the present document.
Figure 5:
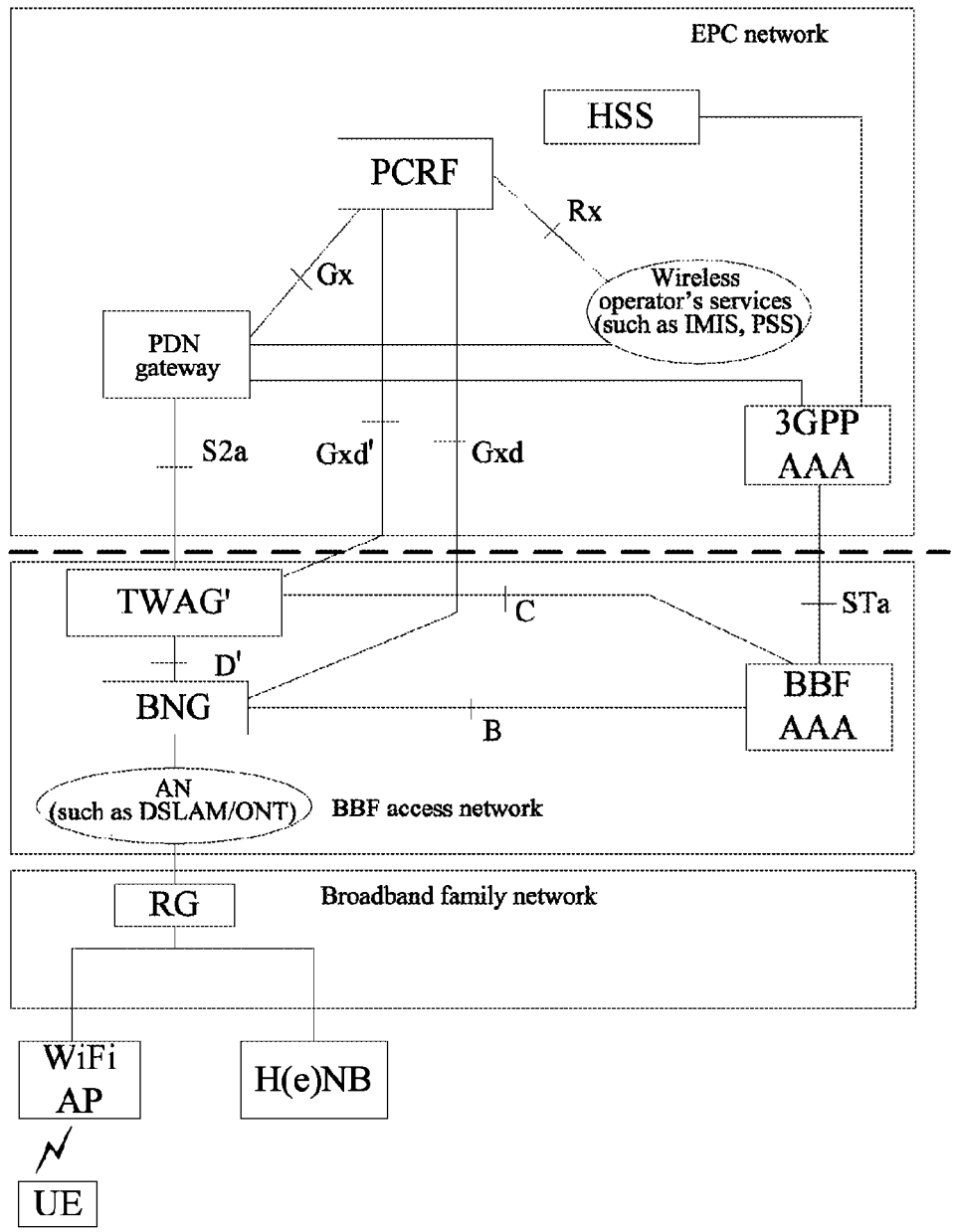
FIG. 5 is a policy control framework 2 in the convergence scenario based on the framework 1 according to the embodiment of the present document.

In the embodiments of the present document, besides the interface configuration as shown in FIG. 3, there are other interface configurations as shown in FIG. 4 and FIG. 5, which includes the following interfaces.

Interface D': is an interface between TWAG' and BNG, and the interface can further implements one of the two following options beside the function defined in the framework as shown in FIG. 3:

(1). by the session established during the access authentication, TWAG' transfers dynamic QoS information to BNG, and BNG feeds back the resource allocation result (can also be called as the admission control result) to TWAG';

(2). it is used to establish a separate policy control session, by which TWAG' transfers dynamic QoS information to BNG, and BNG feeds back the resource allocation result to TWAG' (can also be called as the admission control result).

Interface R': is an interface between TWAG' and BPCF, which is used for policy issuing and result feedback between TWAG' and BPCF.

Interface Gxd': is the interface between TWAG' and PCRF, which is used for policy negotiation and result feedback between TWAG' and PCRF.

The embodiment of the present document provides a method for policy control, wherein a trusted WLAN access gateway receives QoS information from a 3GPP core network and sends QoS information for requesting for resource reservation to AC or BNG; when GTP is applied between the trusted WLAN access gateway and the P-GW, the trusted WLAN access gateway receives QoS information from the P-GW; and when PMIP is applied between the trusted WLAN access gateway and the P-GW, the trusted WLAN access gateway receives QoS information from a PCRF entity or from a PCRF entity through BPCF. Wherein, the trusted WLAN access gateway may sends the QoS information by a RADIUS (Remote Authentication Dial In User Service) session between the trusted WLAN and AC or BNG established during the process of the terminal access authentication, or by the specific policy control session between the trusted WLAN and AC or BNG. When the QoS information is sent by the RADIUS session, the WLAN access gateway is used as a RADIUS proxy, client or server.

The process of the terminal RADIUS authentication and the process of sending the QoS information from 3GPP core network after the terminal authentication succeeds will be introduced respectively with specific embodiments. It should be noted that these embodiments are merely used for illustrating the technical solution of the present document, while not used for limiting the application of the technical solution of the present document. For the convenience in description, as an example, TWAG' is taken as the trusted WLAN access gateway in the following description.

Embodiment 1

Figure 6:
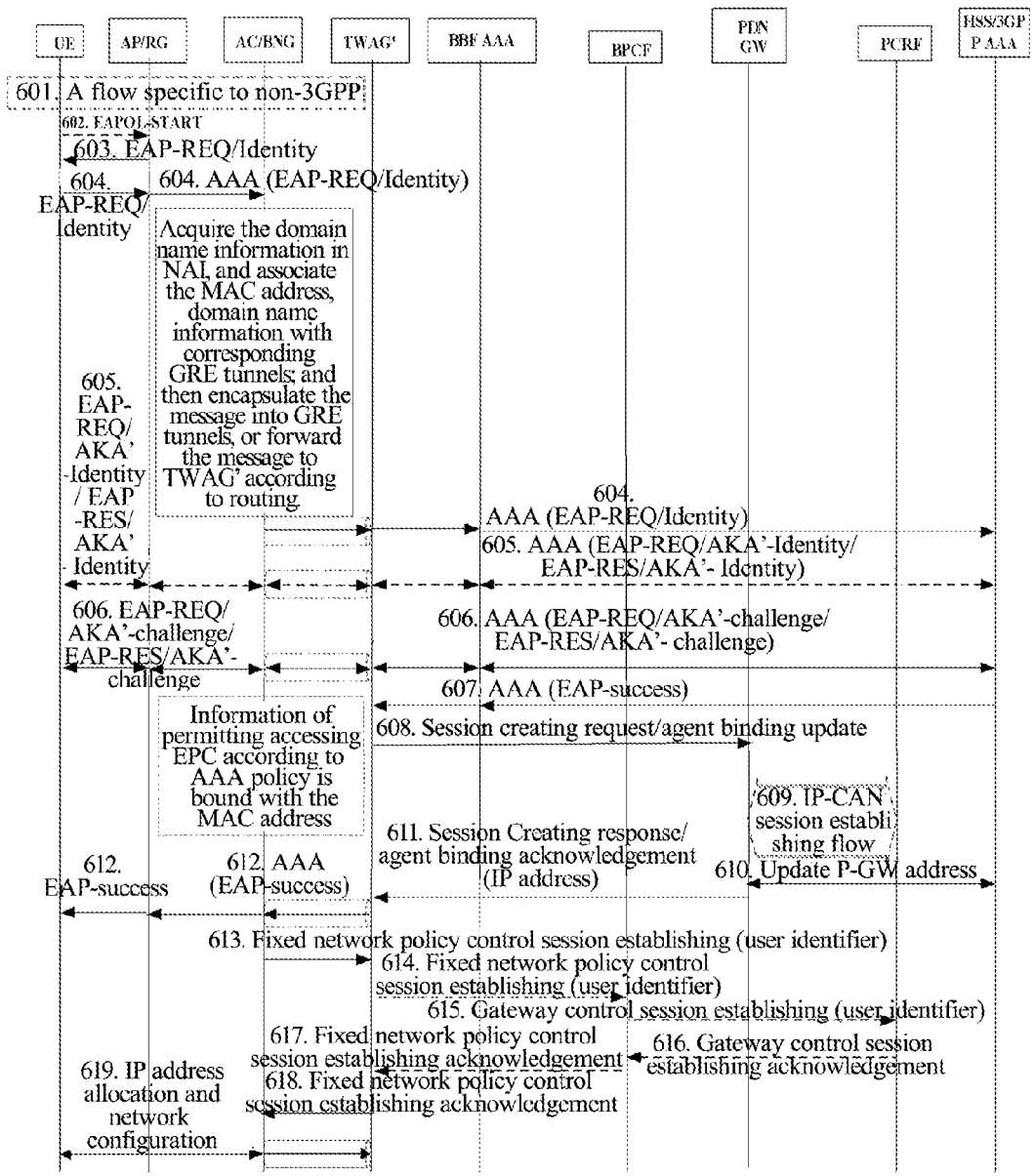
FIG. 6 is a flowchart of a UE accessing an EPC network through a WLAN S2a interface based on the framework 1 according to the embodiment of the present document.

In the embodiment, it mainly describes the flow of a 3GPP UE accessing 3GPP EPC (Evolved Packet Core) network through WLAN. Wherein, the authentication flow of EAP (Extensible Authentication Protocol) is required to forward to BBF AAA (Authentication, Authorization and Accounting) entity through TWAG', AP/RG is used as an EAP authenticator, and AC/BNG and TWAG' are used as AAA agents. When a service type of the 3GPP AAA policy received by AC/BNG is permitting accessing EPC, the embodiment is implemented. In the embodiment, the EAP authentication success message triggers an establishment of a GTP/PMIP tunnel. As shown in FIG. 6, the embodiment comprises the following steps.

Step 601: the UE and WLAN network elements perform a flow specific to non-3GPP, such as link establishment.

Step 602: the UE sends an EAPOL-START message to AP/RG to request for authentication.

Steps 603-604: As the EAP authenticator, AP/PG triggers an EAP authentication flow to UE.

Wherein, the UE carries NAI (Network Access Identifier) in the EAP-RES/Identity message. After receiving the EAP-REP/Identity message encapsulated with AAA, AC/BNG may determine whether the terminal is a 3GPP UE or not according to the authentication type, if the authentication type is not the EAP authentication, then the terminal is taken as a WLAN UE, and the flow in techniques related to a WLAN UE accessing WLAN is implemented; if the authentication type is an EAP authentication, then domain name information in NAI is acquired by analyzing message, and the terminal is determined as a 3GPP UE; alternatively, it may determine the terminal as a 3GPP UE just according to the domain name. if the terminal is a 3GPP UE, then UE MAC (Medium Access Control Address) and domain name information is associated with a corresponding GRE (Generic Routing Encapsulation) tunnel, and the association relationship is saved in the local; afterwards, the message is encapsulated into the GRE tunnel and then is sent to TWAG', or is forwarded to TWAG' according to routing; after receiving the GRE message, TWAG' removes the encapsulation of the head of GRE, and then, acting as the AAA agent, forwards the decapsulated message to BBF AAA, through which the message is forwarded to 3GPP AAA.

In step 604, BNG may be used as a RADIUS Proxy to forward the AAA message; besides, BNG may also be used as a RADIUS Server to end the AAA message from RG, and BNG may further be used as a RADIUS Client to send the AAA message to the TWAG', where the content of the AAA message is coincident with the received content. Similarly, in step 604, TWAG' may be used as a RADIUS Proxy to forward the AAA message; besides, TWAG' may also be used as a RADIUS Server to end the AAA message from BNG, and afterwards, TWAG' may further be used as a RADIUS Client to send the AAA message to BBF AAA, where the content of the AAA message is coincident with the received content.

It should be noted that the GRE tunnel described above may be replaced by other types of tunnel, such as MPLS (Multi Protocol Label Switch) and so on; alternatively, the EAP authentication message is transferred by routing directly, not transmitted by tunnel.

Steps 605-607: the following EAP flow is implemented. When TWAG' receives the EAP authentication success message, step 606 is executed. Wherein, the function of TWAG' is acting as an AAA agent or an AAA relay which is the same as in steps 603-604. In the process of authentication, AC/BNG will acquire the service type of 3GPP AAA authorization, and the service type includes specifically: permitting accessing EPC, and/or seamed service shunting, or refusing accessing EPC. After AC/BNG acquires the service type of 3GPP AAA authorization, if the service type is permitting accessing EPC, the information may be bound with the UE MAC address, and the association relationship is saved in the local. In the embodiment, the service type is permitting accessing EPC. AC/BNG may save the association relationship between the service type and the UE MAC address in the local, and illustrate explicitly that the service type supported by AC/BNG is permitting accessing EPC; alternatively, it may not save the association relationship in the local, and illustrate implicitly that the service type supported by AC/BNG is permitting accessing EPC.

Steps 608-612: after receiving a EAP authentication success message, TWAG' requests P-GW for establishing a GIP/PMIP tunnel, and meanwhile, establishes an IP-CAN (IP Connectivity Access Network) session with PCRF, and upgrades P-GW identifier between the TWAG' and HSS. After receiving a session creating response message or agent binding acknowledgement message, TWAG' sends an EAP authentication success message to the UE through AC/BNG and AP/RG. In step 609, PCEF located at P-GW supplies PCRF with a user identifier and an IP address allocated by P-GW for the UE.

Step 613: as the service type is permitting accessing EPC, BNG sends a fixed network policy control session establishing message carrying a user identifier to TWAG'.

Step 614: TWAG' sends a message to BPCF to request for establishing a fixed network policy control session, and carries a user identifier in the message.

Step 615: BPCF sends a gateway control session establishing message to PCRF, and carries a user identifier in the message. PCRF associates the IP-CAN session established by request in step 608 with the gateway control session established by request in step 615 according to the user identifier.

Step 616: PCRF returns a gateway control session establishing acknowledgement message to BPCF.

Step 617: BPCF returns a message to TWAG' to acknowledge the establishment of the fixed network policy control session.

Step 618: TWAG' returns a message to BNG to acknowledge the establishment of the fixed network policy control session.

Step 619: the UE performs DHCP flow or RS/RA flow to acquire an IP address and related IP configuration parameters. The attachment flow completes. Wherein, after receiving the DHCP request message (which specifically is a DHCPv4 message or DHCPv6 message)/Router Solicitation (RS) message sent by the UE, AC/BNG finds the associated service type thereof is permitting accessing EPC according to the UC MAC address, and then finds the associated GRE tunnel, by which the message is encapsulated into TWAG'; after receiving the GRE message, TWAG' removes the encapsulation of the GRE head, and then deals with the DHCP request message. Similarly, TWAG' encapsulates the DHCP response/router notification message into the GRE head and sends the GRE message to BNG. After receiving the GRE message, BNG removes the encapsulation of the GRE head for processing. At this moment, BNG may bind the IP address with the MAC address.

When receiving the uplink data, BNG/AC may find the associated service type as permitting accessing EPC according to the UE MAC address or UE IP address in the same way, finds the associated GRE tunnel, and then encapsulates the message into TWAG' by the GRE tunnel; after receiving the GRE message, TWAG' removes the encapsulation of the GRE head, and encapsulates the message by GTP tunnel or PMIP tunnel, and forwards the message to P-GW. When receiving downlink data, BNG/AC removes the encapsulation of the GRE head directly, and forwards the message to the UE.

It should be noted that step 613 and step 618 are optional steps, which are performed when the network uses the separate session between BNG and TWAG' to transfer the QoS information and implementation result.

In other embodiments, the establishment of the separate session between BNG and TWAG' may also triggered by TWAG'. That is:

A) in step 613, TWAG' sends a message to BNG to request for establishing fixed network policy control session; in step 618, BNG returns an acknowledgement message to TWAG'; or B) in step 613, TWAG' sends a triggering message to BNG to request BNG to send a message to request for establishing a fixed network policy control session, and after receiving the triggering message, the BNG sends a message to TWAG' to request for establishing the fixed network policy control session; in step 618, TWAG' returns an acknowledgement message to BNG.

Embodiment 2

Figure 7:
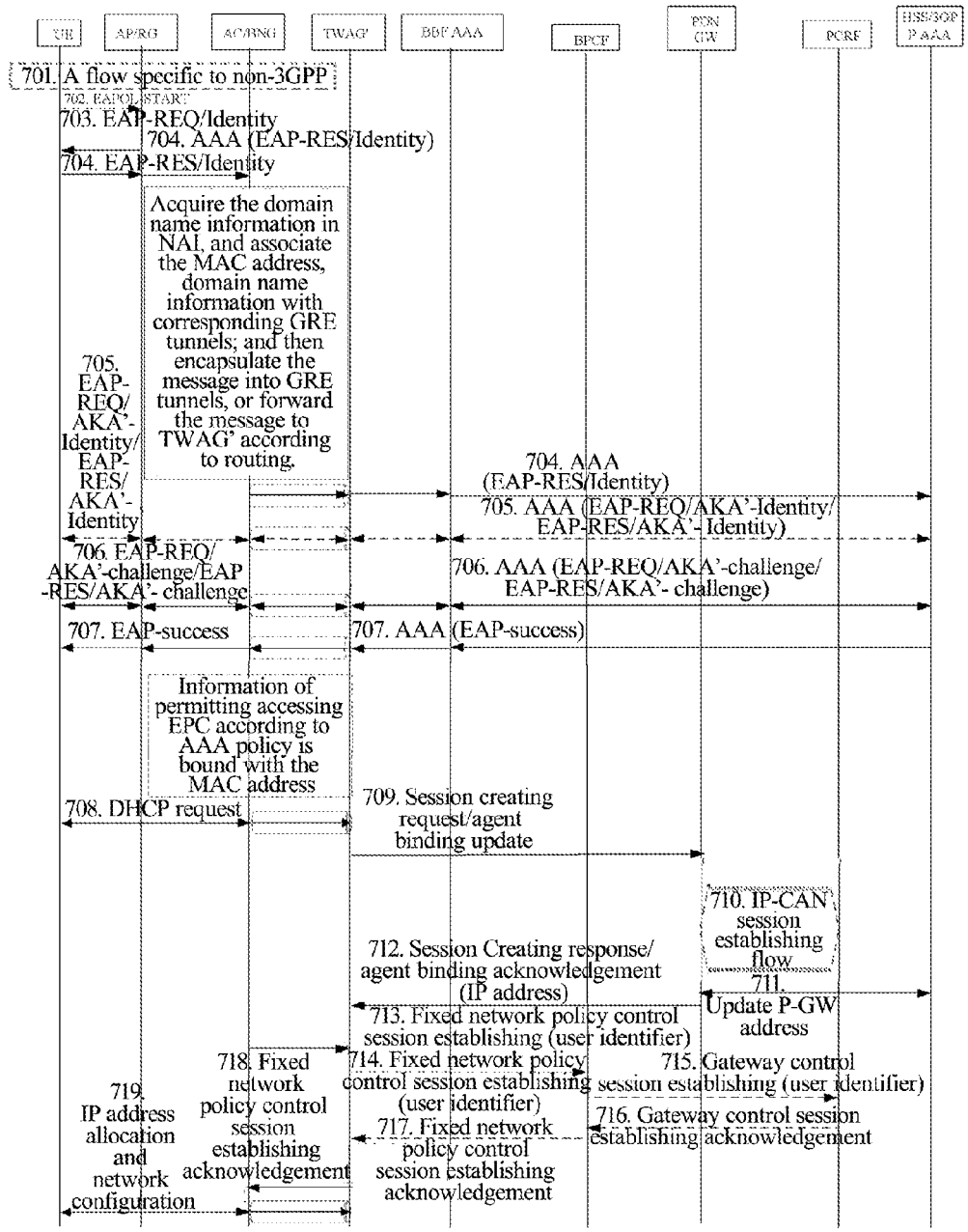
FIG. 7 is a flowchart of a UE accessing an EPC network through a WLAN S2a interface based on the framework 1 according to the embodiment of the present document.

In the embodiment, it mainly describes the flow of a 3GPP UE accessing 3GPP EPC network through WLAN. Wherein, the EAP authentication flow is required to forward to BBF AAA by TWAG', AP/RG is used as an EAP authenticator, and AC/BNG and TWAG' are used as AAA agents. When the service type of the 3GPP AAA policy received by AC/BNG is permitting accessing EPC, the embodiment is implemented. In the embodiment, the DHCP request message triggers the establishment of the GTP/PMIP tunnel. As shown in FIG. 7, the embodiment comprises the following steps.

In Steps 701-707, it is to perform steps 601-606 and step 612.

In Step 708, UE sends the DHCP request message, after receiving the DHCP request message (which specifically is a DHCPv4 message), AC/BNG finds that the associated service type is permitting accessing EPC according to the UE MAC address, finds the associated GRE tunnel, and encapsulates the message into TWAG' according to the GRE tunnel; after receiving the GRE message, TWAG' removes the encapsulation of the GRE head, and deals with the DHCP request message.

In Steps 709-718, it is to perform steps 608-611, step 613 and step 618. Wherein, step 713 may be performed before step 709. Therefore, PCRF may receives the gateway control session establishing message from BPCF at first, and then receives the IP-CAN session establishing message. Steps 714-717 are performed only when TWAG' determines what is established between TWAG' and P-GW is the PMIP tunnel.

Wherein, step 713 and step 718 are optional steps, which are performed when the network uses the separate session between BNG and TWAG' to transfer the QoS information and implementation result.

In other embodiments, the establishment of the separate session between BNG and TWAG' may also be triggered by TWAG'. That is:

A) in step 713, TWAG' sends a message to BNG to request for establishing a fixed network policy control session; in step 718, BNG returns an acknowledgement message to TWAG'; or B) in step 713, TWAG' sends a triggering message to BNG to request BNG to send a message to request for establishing a fixed network policy control session, and after receiving the triggering message, the BNG sends a message to TWAG' to request for establishing the fixed network policy control session; in step 718, TWAG' returns an acknowledgement message to BNG In Step 719, the UE performs a DHCP flow or RS/RA (Router Advertisement) flow to acquire the IP address and related IP configuration parameters. The attachment flow completes.

When receiving the uplink data, BNG/AC may find that the associated service type is permitting accessing EPC according to the UE MAC address or UE IP address in the same way, finds the associated GRE tunnel, and then encapsulates the message into TWAG' by the GRE tunnel; after receiving the GRE message, TWAG' removes the encapsulation of GRE head, and encapsulates the message by the GTP tunnel or PMIP tunnel, and forwards the message to P-GW. When receiving downlink data, BNG/AC removes the encapsulation of GRE head directly, and forwards the message to the UE.

Embodiment 3

Figure 8:
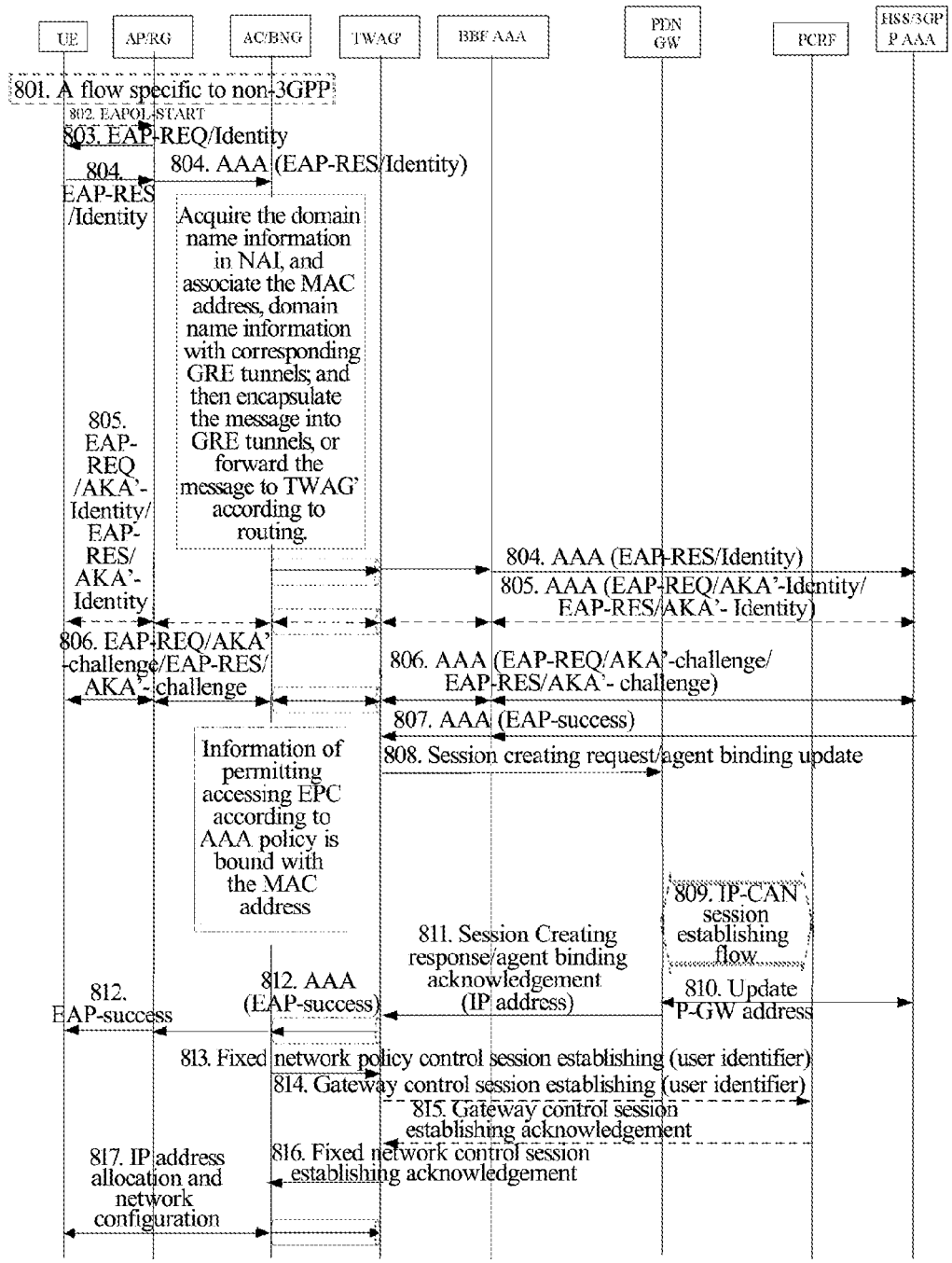
FIG. 8 is a flowchart of a UE accessing an EPC network through a WLAN S2a interface based on the framework 2 according to the embodiment of the present document.

In the embodiment, it mainly describes the flow of a 3GPP UE accessing 3GPP EPC network through WLAN. Wherein, the EAP authentication flow is required to forward to BBF AAA by TWAG', AP/RG is used as an EAP authenticator, and AC/BNG and TWAG' are used as AAA agents. When the service type of the 3GPP AAA policy received by AC/BNG is permitting accessing EPC, the embodiment is implemented. In the embodiment, the EAP authentication success message triggers the establishment of the GTP/PMIP tunnel. As shown in FIG. 8, the embodiment comprises the following steps specifically.

In Steps 801-813, it is to perform the flow of steps 601-613.

In Step 814, TWAG' sends the gateway control session establishing message to PCRF, carrying a user identifier in the message.

PCRF associates the IP-CAN session established by request in step 808 with the gateway control session established by request in step 814 according to the user identifier.

In Step 815, PCRF returns the fixed network policy control session establishing acknowledgement message to TWAG'.

In Steps 816-817, it is to perform the flow of steps 618-619.

Wherein, step 813 and step 816 are optional steps, and are performed when the network transfers the QoS information and implementation result by the separate session between BNG and TWAG'.

In other embodiments, the establishment of the separate session between BNG and TWAG' may also be triggered by TWAG'. That is:

A) in step 813, TWAG' sends a message to BNG to request for establishing a fixed network policy control session; in step 816, BNG returns an acknowledgement message to TWAG'; or B) in step 813, TWAG' sends a triggering message to BNG to request BNG to send a message to request for establishing a fixed network policy control session, and after receiving the triggering message, the BNG sends a message to TWAG' to request for establishing the fixed network policy control session; in step 818, TWAG' returns an acknowledgement message to BNG.

Embodiment 4

Figure 9:
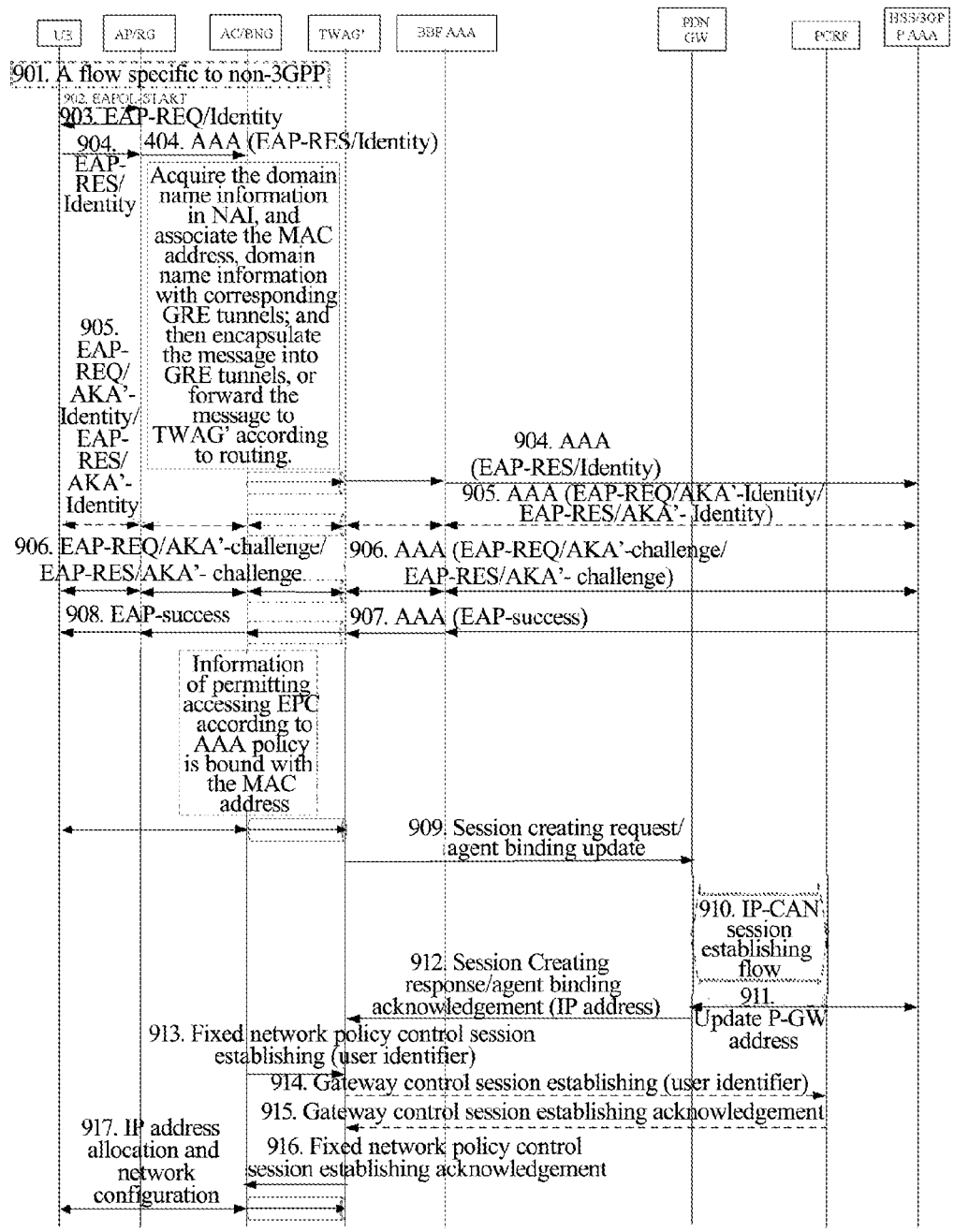
FIG. 9 is a flowchart of a UE accessing an EPC network through a WLAN S2a interface based on the framework 2 according to the embodiment of the present document.

In the embodiment, it mainly describes the flow of a 3GPP UE accessing 3GPP EPC network through WLAN. Wherein, the EAP authentication flow is required to forward to BBF AAA by TWAG', AP/RG is used as an EAP authenticator, and AC/BNG and TWAG' are used as AAA agents. When the service type of the 3GPP AAA policy received by AC/BNG is permitting accessing EPC, the embodiment is implemented. In the embodiment, the DHCP request message triggers the establishment of the GTP/PMIP tunnel. As shown in FIG. 9, the embodiment comprises the following steps specifically.

In Steps 901-913, it is to perform steps 701-713.

In Step 914, TWAG' sends the gateway control session establishing message to PCRF, carrying a user identifier in the message.

PCRF associates the IP-CAN session established by request in step 910 with the gateway control session established by request in step 914 according to the user identifier.

In Step 915, PCRF returns the fixed network policy control session establishing acknowledgement message to TWAG'.

In Steps 916-917, it is to perform the flow of steps 718-719.

Wherein, step 913 and step 916 are optional steps, and are performed when the network transfers the QoS information and implementation result by the separate session between BNG and TWAG'.

In other embodiments, the establishment of the separate session between BNG and TWAG' may also be triggered by TWAG'. That is:

A) in step 913, TWAG' sends a message to BNG to request for establishing a fixed network policy control session; in step 916, BNG returns an acknowledgement message to TWAG'; or B) in step 913, TWAG' sends a triggering message to BNG to request BNG to send a message to request for establishing a fixed network policy control session, and after receiving the triggering message, the BNG sends a message to TWAG' to request for establishing the fixed network policy control session; in step 916, TWAG' returns an acknowledgement message to BNG Embodiment 5

Figure 10:
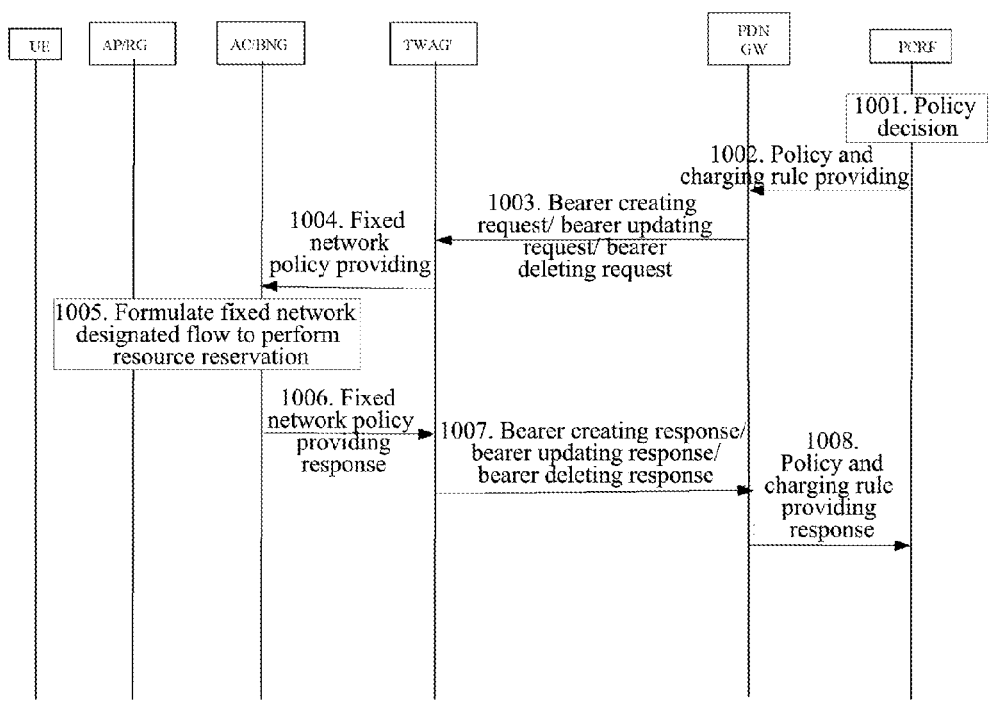
FIG. 10 is a flowchart of resource reserving in the case of a GTP tunnel.

This embodiment describes a flow that a UE performs service visiting and PCRF formulates corresponding policy to perform resource reservation when the GTP tunnel is established between TWAG' and P-GW after the flow as shown in FIG. 6, FIG. 7, FIG. 8 or FIG. 9 is performed. Referring to FIG. 10, the process includes the following steps.

In Step 1001, after receiving triggering, PCRF performs policy decision, including formulating PCC rules, updating PCC rules or deciding to delete the issued PCC rules etc.

In Step 1002, PCRF sends a policy charging rule providing message to P-GW, provides the policy formulated by PCRF, including issuing newly formulated PCC rules, updating PCC rules or deleting the issued PCC rules.

In Step 1003, after performing the policy, P-GW sends a bearer creating request message, a bearer updating request message, or a bearer deleting request message to TWAG', wherein, the bearer creating request message and the bearer updating request message carry the corresponding QoS information, and the QoS information includes QCI (QoS Class Identifier, QoS grade identifier), ARP (Allocation and Reservation Priority), GBR (Guaranteed Bitrates), MBR (Maximum Bitrates) and so on.

In Step 1004, TWAG' sends a fixed network policy providing message to AC/BNG, and carries the QoS information provided by P-GW to TWAG' in the message, and the information may be QCI, ARP, GBR and MBR, or QoS parameters specific to a fixed network mapped by TWAG' according to the above information.

Wherein, the session by which TWAG' sends a fixed network policy providing message to AC/BNG is the session established between BNG and TWAG' in the process of a terminal access authentication; or is the separate session established between BNG and TWAG', such as the session established in steps 613, 618; steps 713, 718; steps 813, 816 and steps 913 and 916.

In Step 1005, AC/BNG or other fixed network access devices execute a fixed network designated flow to perform admission control and/or resource allocation according to the QoS information provided in step 1004.

In Step 1006, AC/BNG returns a fixed network policy providing acknowledgement message to TWAG' to return admission control and/or resource allocation.

In Step 1007, TWAG' returns a bearer creating response message, a bearer updating response message or a bearer deleting response message to P-GW.

In Step 1008, P-GW returns a policy charging rule providing response message to PCRF.

Embodiment 6

Figure 11:
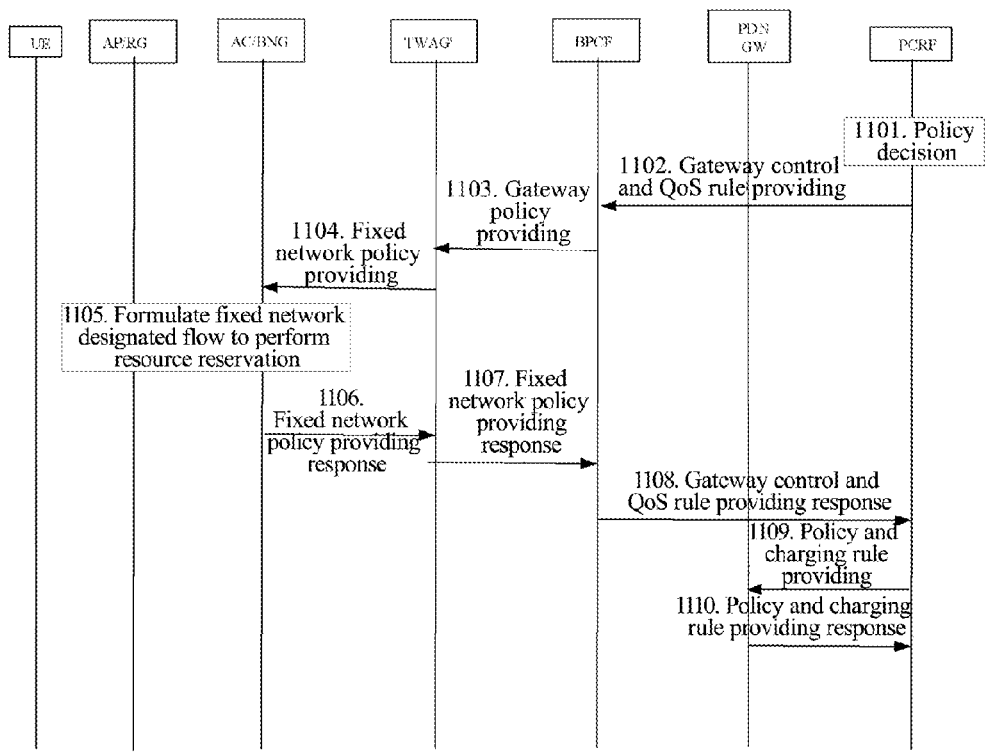
FIG. 11 is a flowchart of resource reserving in the case of a PMIP tunnel based on the framework 1.

This embodiment describes the flow that a UE performs service visiting and PCRF formulates corresponding policy to perform resource reservation when the PMIP tunnel is established between TWAG' and P-GW after the flow as shown in FIG. 6, FIG. 7 is performed. Referring to FIG. 11, the flow includes the following steps.

In Step 1101, after receiving triggering, PCRF performs policy decision, including formulating PCC rules, updating PCC rules or deciding to delete the issued PCC rules etc. PCRF further formulates QoS rules, updates QoS rules or decides to delete the issued QoS rules etc. according to policy.

In Step 1102, PCRF sends a gateway control and QoS rule providing message to BPCF, provides the policy formulated by PCRF, including issuing newly formulated QoS rules, updating QoS rules or deleting the issued QoS rules.

In Step 1103, BPCF sends a fixed network policy providing message to TWAG', carrying the QoS information provided by PCRF to BPCF in the message, and the information may be QCI, ARP, GBR and MBR, or the QoS parameters specific to the fixed network mapped by BPCF according to the above information.

In Step 1104, TWAG' sends a fixed network policy providing message to AC/BNG, carrying the QoS information provided by BPCF to TWAG' in the message, and the information may be QCI, ARP, GBR and MBR, or QoS parameters specific to the fixed network mapped by TWAG' according to the above information.

Wherein, the session by which TWAG' sends a message to AC/BNG is the session established between BNG and TWAG' in the process of access authentication as shown in FIG. 6, FIG. 7, FIG. 8 or FIG. 9; or is the separate session established between BNG and TWAG', such as the session established in steps 613, 618; steps 713, 718; steps 813, 816 and steps 913 and 916.

In Step 1105, AC/BNG or other fixed network access devices execute fixed network designated flow to perform admission control and/or resource allocation according to the QoS information provided in step 1104.

In Step 1106, AC/BNG returns a fixed network policy providing acknowledgement message to TWAG' to return an admission control and/or resource allocation result.

In Step 1107, TWAG' returns the fixed network policy providing acknowledgement message to BPCF to return an admission control and/or resource allocation result.

In Step 1108, BPCF returns a gateway control and QoS rule providing response message to PCRF to return an admission control and/or resource allocation result.

In Step 1109, if admission control and/or resource allocation succeeds, PCRF sends a policy charging rule providing message to P-GW to provide policy formulated by PCRF, including issuing newly formulated PCC rules, updating PCC rules or deleting issued PCC rules.

In Step 1110, P-GW returns an acknowledgement message to PCRF.

Embodiment 7

Figure 12:
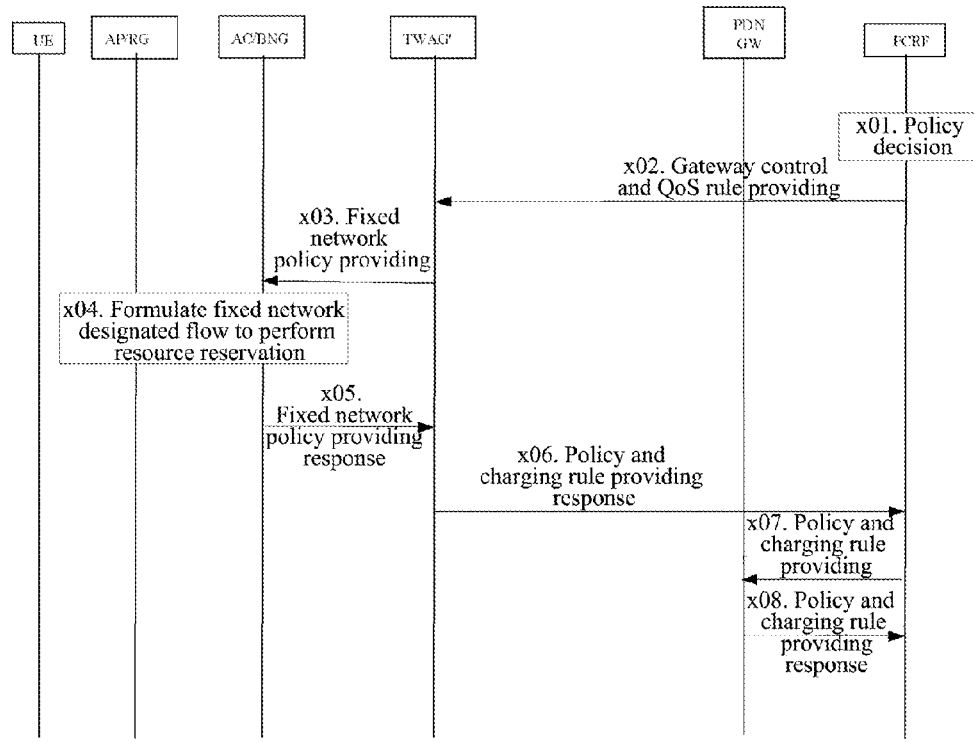
FIG. 12 is a flowchart of resource reserving in the case of a PMIP tunnel based on the framework 2.

This embodiment describes the flow that a UE performs service visiting and PCRF formulates corresponding policy to perform resource reservation when the PMIP tunnel is established between TWAG' and P-GW after the flow as shown in FIG. 8 and FIG. 9 is performed. Referring to FIG. 12, the flow includes the following steps.

In Step 1201, after receiving triggering, PCRF performs policy decision, including formulating PCC rules, updating PCC rules or deciding to delete the issued PCC rules etc. PCRF further formulates QoS rules, updates QoS rules or decides to delete the issued QoS rules etc. according to the policy.

In Step 1202, PCRF sends a gateway control and QoS rule providing message to TWAG', provides the policy formulated by PCRF, including issuing newly formulated QoS rules, updating QoS rules or deleting the issued QoS rules.

In Step 1203, TWAG sends a fixed network policy providing message to AC/BNG, carrying the QoS information provided by BPCF to TWAG' in the message, and the information may be QCI, ARP, GBR and MBR, or the QoS parameters specific to a fixed network mapped by TWAG' according to the above information.

Wherein, the session by which TWAG' sends a message to AC/BNG is the session established between BNG and TWAG' in the process of access authentication as shown in FIG. 6, FIG. 7, FIG. 8 or FIG. 9; or is the separate session established between BNG and TWAG', such as the session established in steps 613, 618; steps 713, 718; steps 813, 816 and steps 913 and 916.

In Step 1204, AC/BNG or other fixed network access devices execute fixed network designated flow to perform admission control and/or resource allocation according to the QoS information provided in step 1203.

In Step 1205, AC/BNG returns a fixed network policy providing acknowledgement message to TWAG' to return admission control and/or resource allocation.

In Step 1206, TWAG' returns the fixed network policy providing acknowledgement message to PCRF to return admission control and/or resource allocation.

In Step 1207, if admission control and/or resource allocation succeeds, PCRF sends a policy charging rule providing message to P-GW to provide policy formulated by PCRF, including issuing newly formulated PCC rules, updating PCC rules or deleting issued PCC rules.

In Step 1208, P-GW returns an acknowledgement message to PCRF.

By applying the method provided by the embodiments of present document, the interface configuration and policy configuration are performed for the trusted WLAN access gateway in the fixed mobile convergence scenario, thereby the policy control in the fixed mobile convergence scenario is implemented.

Figure 13:
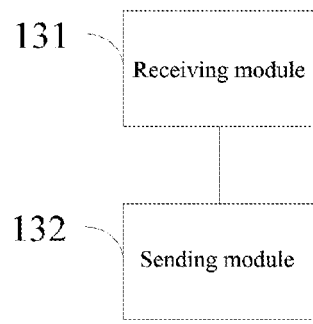
FIGS. 13-16 are structural schematic diagrams of trusted WLAN access gateways according to the embodiment of the present document.

Based on the technical idea same to the above method embodiments, an embodiment of the present document further provides a trusted WLAN access gateway, as shown in FIG. 13, the trusted WLAN access gateway comprises:

a receiving module 131, configured to: receive Quality of Service (QoS) information from a 3GPP core network;

a sending module 132, configured to: send the QoS information to an Access Controller (AC) or a Broadband Network Gateway (BNG).

Figure 14:
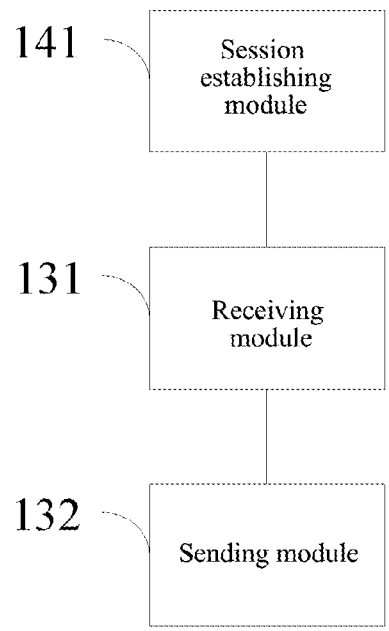

As shown in FIG. 14, the trusted WLAN access gateway further comprises a session establishing module 141, and the session establishing module 141 is configured to: establish a Remote Authentication Dial In User Service (RADIUS) session with the AC or the BNG during the process of a terminal access authentication, or, establish a designated policy session with the AC or the BNG; the sending module 131 is configured to: send the QoS information by the RADIUS session or the designated policy control session between the trusted WLAN access gateway and the AC or the BNG.

When the RADIUS session sends the QoS information, the trusted WLAN access gateway is used as a RADIUS Proxy, Client or Server.

Wherein, the receiving module 132 is configured to:

receive QoS service quality information from the P-GW when a General Tunnel Protocol (GTP) is adopted between the trusted WLAN access gateway and a Packet Data Network Gateway (P-GW);

receive the QoS information from a Policy and Charging Rule Function (PCRF) entity or from the PCRF entity through a Broadband Policy Control Framework (BPCF) when Proxy Mobile Internet Protocol (PMIP) is adopted between the trusted WLAN access gateway and the P-GW.

Figure 15:
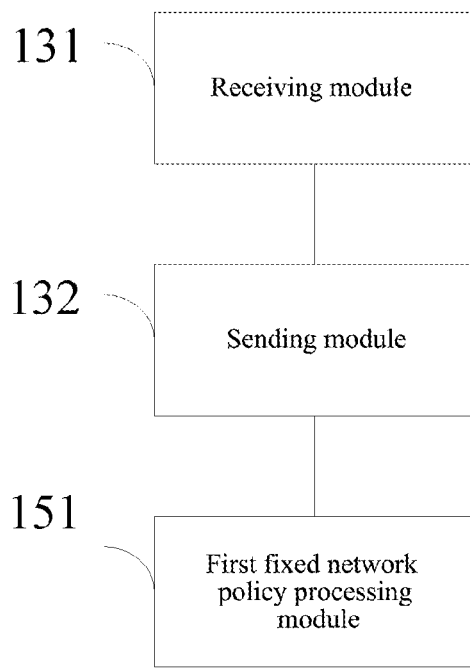

As shown in FIG. 15, the trusted WLAN access gateway may further comprise: a first fixed network policy processing module 151, the first fixed network policy processing module 151 is configured to: receive a message for requesting for establishing a fixed network policy control session sent by the AC or the BNG; and send an acknowledgement message of the message for requesting for establishing a fixed network policy control session;

or, send the message for requesting for establishing a fixed network control session to the AC or the BNG; receive the acknowledgement message of the message for requesting for the fixed network policy control session sent by the AC or the BNG;

or, send a triggering message for requesting for establishing a fixed network policy control session to the AC or the BNG, receive a message for requesting for establishing the fixed network policy control session sent by the AC or the BNG, and send the acknowledgement message of the message for requesting for establishing the fixed network policy control session to the AC or the BNG.

The first fixed network policy processing module 151 is configured to:

in the case that the terminal access authentication succeeds, receive the message for requesting for establishing the fixed network policy control session sent by the AC or the BNG, or send the message for requesting for establishing the fixed network policy control session to the AC or the BNG, or send the triggering message for requesting for establishing the fixed policy control session to the AC or the BNG;

or after the terminal initiates a Dynamic Host Configuration Protocol (DHCP) request, receive the message for requesting for establishing the fixed network policy control session sent by the AC or the BNG, or send the message for requesting for establishing the fixed network policy control session to the AC or the BNG, or send the triggering message for requesting for establishing the fixed network policy control session to the AC or the BNG.

Figure 16:
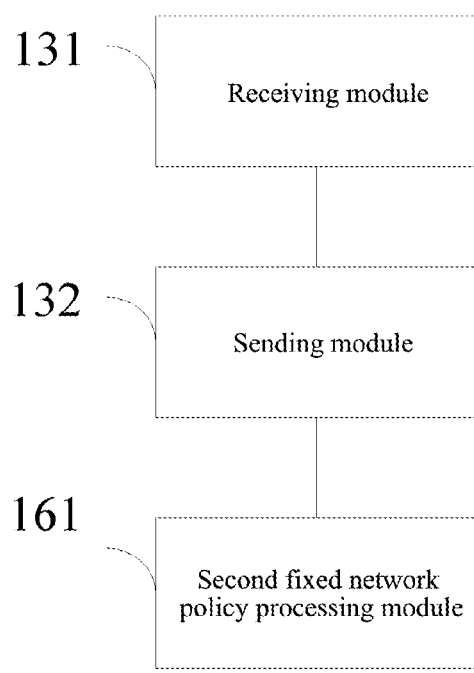

As shown in FIG. 16, the trusted WLAN access gateway further comprises: a second fixed network policy processing module 161, the second fixed network policy processing module 161 is configured to: when PMIP is adopted between the trusted WLAN access gateway and the P-GW, send the message for requesting for establishing the fixed network policy control session to the BPCF; receive the acknowledgement message of the message for requesting for establishing the fixed network policy control session sent by the BPCF.

Or, the second fixed network policy processing module 161 is further configured to: when PMIP is adopted between the trusted WLAN access gateway and the P-GW, send a gateway control session establishing message to the PCRF; and receive a gateway control session establishing acknowledgement message sent by the PCRF.

Based on the technical idea same to the above method embodiments, an embodiment of the present document further provides a system for policy control, comprising AC or BNG, and the trusted WLAN access gateway provided by the embodiment described above.

By applying the equipment and system provided by the embodiments of the present document, the interface configuration and policy configuration are performed for the trusted WLAN access gateway in the fixed mobile convergence scenario, thereby the policy control is implemented in the fixed mobile convergence scenario.

It should be understood by the ordinary persons skilled in the art that the whole or part of the steps in the above method can be completed by a program instructing relevant hardware, the program may be stored in computer readable storage medium, such as readable memory, magnet disk or optical disk. Optionally, the whole or part of the steps in the above embodiments can be implemented with one or more integrated circuits. Accordingly, the respective module/unit in the above embodiments can be implemented by use of hardware or software function module. In this way, the present document is not limited to any particular combination of hardware and software.

INDUSTRIAL APPLICABILITY

By applying the method, equipment and system provided by the embodiments of the present document, the interface configuration and policy configuration are performed for the WLAN access gateway in the fixed mobile convergence scenario, thereby the policy control is implemented in the fixed mobile convergence scenario.

What we claim is:

1. A method for policy control, comprising:
a trusted Wireless Local Area Network (WLAN) access gateway receiving Quality of Service (QoS) information from a 3GPP core network, and sending the QoS information to an Access Controller (AC) or a Broadband Network Gateway (BNG);
the AC or the BNG or other fixed network access devices performing admission control and/or resource allocation according to the QoS information;
configuring an interface D' between the trusted WLAN access gateway and the AC or the BNG, and using the interface D' to implement one of the following functions: transferring the QoS information and admission control and/or resource allocation result by a Remote Authentication Dial In User Service (RADIUS) session established during a terminal access authentication; establishing a separate policy control session to transfer the QoS information and the admission control and/or resource allocation result.

2. The method according to claim 1, wherein, the step of sending the QoS information to the AC or the BNG comprises:
sending the QoS information by the RADIUS session between the trusted WLAN access gateway and the AC or the BNG established during the terminal access authentication, or by a designated policy control session between the trusted WLAN and the AC or the BNG.

3. The method according to claim 2, wherein, when the QoS information is sent by the RADIUS session, the trusted WLAN access gateway is used as a RADIUS proxy, a client or a server.

4. The method according to claim 1, wherein, the step of the trusted WLAN access gateway receiving the QoS information from the 3GPP core network comprises:
when a General Tunnel Protocol (GTP) is applied between the trusted WLAN access gateway and a Packet Data Network Gateway (P-GW), the trusted WLAN access gateway receiving the QoS information from the P-GW; and
when a Proxy Mobile Internet Protocol (PMIP) is applied between the trusted WLAN access gateway and the P-GW, the trusted WLAN access gateway receiving the QoS information from a Policy and Charging Rule Function (PCRF) entity or from the PCRF entity through a Broadband Policy Control Function (BPCF).

5. The method according to claim 1, further comprising:
the trusted WLAN access gateway receiving a message for requesting for establishing a fixed network policy control session sent by the AC or the BNG, the trusted WLAN access gateway sending an acknowledgement message of the message for requesting for establishing the fixed network policy control session to the AC or the BNG; or the trusted WLAN access gateway sending the message for requesting for establishing the fixed network policy control session to the AC or the BNG, the trusted WLAN access gateway receiving the acknowledgement message of the message for requesting for establishing the fixed network policy control session sent by the AC or the BNG; or the trusted WLAN access gateway sending a triggering message for requesting for establishing the fixed network policy control session to the AC or the BNG, receiving the message for requesting for establishing the fixed network policy control session sent by the AC or the BNG, the trusted WLAN access gateway sending the acknowledgement message of the message for requesting for establishing the fixed network policy control session to the AC or the BNG.

6. The method according to claim 5, further comprising:
when a Proxy Mobile Internet Protocol (PMIP) is adopted between the trusted WLAN access gateway and a Packet Data Network Gateway (P-GW), the trusted WLAN access gateway sending the message for requesting for establishing the fixed network policy control session to a Broadband Policy Control Function (BPCF); the trusted WLAN access gateway receiving the acknowledgement message of the message for requesting for establishing the fixed network policy control session sent by the BPCF.

7. The method according to claim 5, further comprising:
when a Proxy Mobile Internet Protocol (PMIP) is adopted between the trusted WLAN access gateway and a Packet Data Network Gateway (P-GW), the trusted WLAN access gateway sending a gateway control session establishing message to a Policy and Charging Rule Function (PCRF); and the trusted WLAN access gateway receiving a gateway control session establishing acknowledgement message sent by the PCRF.

8. The method according to claim 5, wherein, the step of the trusted WLAN access gateway receiving the message for requesting for establishing the fixed network policy control session sent by the AC or the BNG; or the trusted WLAN access gateway sending the message for requesting for establishing the fixed network policy control session to the AC or the BNG; or the trusted WLAN access gateway sending the triggering message for requesting for establishing the fixed network policy control session to the AC or the BNG comprises:
in a case that the terminal access authentication succeeds, the trusted WLAN access gateway receiving the message for requesting for establishing the fixed network policy control session sent by the AC or the BNG, or the trusted WLAN access gateway sending the message for requesting for establishing the fixed network policy control session to the AC or the BNG, or the trusted WLAN access gateway sending the triggering message for requesting for establishing the fixed network policy control session to the AC or the BNG;
or
after the terminal initiates a Dynamic Host Configuration Protocol (DHCP) request, the trusted WLAN access gateway receiving the message for requesting for establishing the fixed network policy control session sent by the AC or the BNG, or the trusted WLAN access gateway sending the message for requesting for establishing the fixed network policy control session to the AC or the BNG, or the trusted WLAN access gateway sending the triggering message for requesting for establishing the fixed network policy control session to the AC or the BNG.

9. The method according to claim 1, further comprising: configuring an interface R' between the trusted WLAN access gateway and a Broadband Policy Control Function (BPCF), and using the interface R' to implement policy issuing and result feedback between the trusted WLAN access gateway and the BPCF.

10. The method according to claim 1, further comprising: configuring an interface Gxd' between the trusted WLAN access gateway and a Policy and Charging Rule Function (PCRF), and using the interface Gxd' to implement policy negotiation and result feedback between the trusted WLAN access gateway and the PCRF.

11. A trusted Wireless Local Area Network (WLAN) access gateway, comprising a processor and a storage device, wherein the storage device stores processor-executable programs, and the programs comprise:
  a receiving module, configured to: receive Quality of Service (QoS) information from a 3GPP core network;
  a sending module, configured to: send the QoS information to an Access Controller (AC) or a Broadband Network Gateway (BNG); and
  the trusted WLAN access gateway further comprising: an interface D' between the trusted WLAN access gateway and the AC or the BNG, configured to: transfer the QoS information and admission control and/or resource allocation result by a Remote Authentication Dial In User Service (RADIUS) session established during a terminal access authentication, establish a separate policy control session to transfer the QoS information and the admission control and/or resource allocation result.

12. The trusted WLAN access gateway according to claim 11, wherein the programs further comprise: a session establishing module, wherein,
  the session establishing module is configured to: establish the RADIUS session with the AC or the BNG during the terminal access authentication, or establish a designated policy control session with the AC or the BNG;
  the sending module is configured to: send the QoS information by the RADIUS session or the designated policy control session between the trusted WLAN access gateway and the AC or the BNG.

13. The trusted WLAN access gateway according to claim 12, wherein, when the QoS information is sent by the RADIUS session, the trusted WLAN access gateway is used as a RADIUS Proxy, a Client or a Server.

14. The trusted WLAN access gateway according to claim 11, wherein, the receiving module is configured to:
  receive the QoS information from a Packet Data Network Gateway (P-GW) when a General Tunnel Protocol (GTP) is adopted between the trusted WLAN access gateway and the P-GW;
  receive the QoS information from a Policy and Charging Rule Function (PCRF) entity or from the PCRF entity through a Broadband Policy Control Framework (BPCF) when a Proxy Mobile Internet Protocol (PMIP) is adopted between the trusted WLAN access gateway and the P-GW.

15. The trusted WLAN access gateway according to claim 11, wherein the programs further comprise: a first fixed network policy processing module, wherein,
  the first fixed network policy processing module is configured to: receive a message for requesting for establishing a fixed network policy control session sent by the AC or the BNG; and send an acknowledgement message of the message for requesting for establishing the fixed network policy control session to the AC or the BNG;
  or, send the message for requesting for establishing the fixed network policy control session to the AC or the BNG; receive the acknowledgement message of the message for requesting for establishing the fixed network policy control session sent by the AC or the BNG;
  or, send a triggering message for requesting for establishing the fixed network policy control session to the AC or the BNG, receive the message for requesting for establishing the fixed network policy control session sent by the AC or the BNG, and send the acknowledgement message of the message for requesting for establishing the fixed network policy control session to the AC or the BNG.

16. The trusted WLAN access gateway according to claim 15, wherein, the first fixed network policy processing module is configured to:
  in a case that the terminal access authentication succeeds, receive the message for requesting for establishing the fixed network policy control session sent by the AC or the BNG, or send the message for requesting for establishing the fixed network policy control session to the AC or the BNG, or send a triggering message for requesting for establishing the fixed network policy control session to the AC or the BNG;
  or
  after the terminal initiates a Dynamic Host Configuration Protocol (DHCP) request, receive the message for requesting for establishing the fixed network policy control session sent by the AC or the BNG, or send the message for requesting for establishing the fixed network policy control session to the AC or the BNG, or send the triggering message for requesting for establishing the fixed network policy control session to the AC or the BNG.

17. The trusted WLAN access gateway according to claim 15, wherein the programs further comprise: a second fixed network policy processing module, wherein,
  the second fixed network policy processing module is configured to: when a Proxy Mobile Internet Protocol (PMIP) is adopted between the trusted WLAN access gateway and a Packet Data Network Gateway (P-GW), send the message for requesting for establishing the fixed network policy control session to a Broadband Policy Control Function (BPCF); receive the acknowledgement message of the message for requesting for establishing the fixed network policy control session sent by the BPCF.

18. The trusted WLAN access gateway according to claim 15, wherein,
  the second fixed network policy processing module is further configured to: when a PMIP is adopted between the trusted WLAN access gateway and a Packet Data Network Gateway (P-GW), send a gateway control session establishing message to a Policy and Charging Rule Function (PCRF); and receive a gateway control session establishing acknowledgement message sent by the PCRF.

19. A system for policy control, comprising an Access Controller (AC) or a Broadband Network Gateway (BNG), and the trusted Wireless Local Area Network (WLAN) access gateway according to claim 11.

* * * * *